(12) United States Patent
Takeda et al.

(10) Patent No.: US 6,465,911 B1
(45) Date of Patent: Oct. 15, 2002

(54) POWER SUPPLY SYSTEM SWITCHING DEVICE AND METHOD OF SWITCHING BETWEEN POWER SUPPLY SYSTEM

(75) Inventors: Masatoshi Takeda; Isao Kamiyama, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 44 days.

(21) Appl. No.: 09/604,881

(22) Filed: Jun. 28, 2000

(30) Foreign Application Priority Data

Jan. 7, 2000 (JP) ........................................ 2000-001621

(51) Int. Cl.[7] ................................................. H02J 3/00
(52) U.S. Cl. ......................................... 307/70; 307/115
(58) Field of Search ............................... 307/70, 43, 64, 307/87, 80, 65, 42, 115

(56) References Cited

U.S. PATENT DOCUMENTS 3,662,182 A * 5/1972 Ullmann et al. ............... 307/64
4,695,741 A * 9/1987 Takeda ........................ 307/43
5,644,175 A * 7/1997 Galm .......................... 307/131
5,650,901 A * 7/1997 Yamamoto ................... 361/100
6,051,893 A   4/2000 Yamamoto et al.

OTHER PUBLICATIONS

"New Electric Installation Dictionary", Fig. 2–2, p. 238.
Schwartzenberg et al.; "15 k V Medium Voltage Static Transfer Switch", *IEEE*, pp. 2515–2520, 1995.

* cited by examiner

Primary Examiner—Stephen W. Jackson
Assistant Examiner—Roberto J. Rios
(74) Attorney, Agent, or Firm—Leydig Voit & Mayer, Ltd.

(57) ABSTRACT

For a load connected to the connection points of first and second mechanical bypass switches connected to first and second power supply systems, respectively, and a semiconductor switch connected in parallel with the second bypass switch, the power supply is switched from the first power supply system to the second power supply system, the first bypass switch is opened, and a semiconductor switch conducts whereby current through the first bypass switch is commutated to flow through the semiconductor switch, and then the second bypass switch is closed, whereby the load is switched and connected to the second power supply system.

17 Claims, 9 Drawing Sheets

STATE BEFORE SWITCHING

OPENING OF BYPASS SWITCH 10

OPENING OF BYPASS SWITCH 10 CAUSED BY SELECTIVE TURNING ON OF THYRISTOR

OVERALL TURNING ON OF THRYISTOR SWITCH

CLOSING OF BYPASS SWITCH 12 AND SWITCHING OF SWITCH 18

POWER SUPPLY SYSTEM SWITCHING DEVICE AND METHOD OF SWITCHING BETWEEN POWER SUPPLY SYSTEM

BACKGROUND OF THE INVENTION

1. Field of the Invention

The present invention relates to a power supply system switching device which selects one of plural different AC sources by switching when power is supplied to a load from the plural different AC sources, whereby the power is supplied to the load, and more particularly, to a power supply system switching device which can switch the load to connect to an other normal power supply system when one of the sources supplying power to the load is voltage-disturbed, and a method of switching between power supply systems.

2. Description of the Related Art

Related Art 1

FIG. 13 shows a two line normal service/auxiliary switching circuit which is one of the conventional power supply system switching devices, described in Dictionary of Electric Equipment New Edition, published by Industrial Research Center of Japan Inc., May 1989. In FIG. 13, shown are a first AC source 1, which is a first power supply system, a second AC source 2, which is a second power supply system, a first mechanical switch 3, a second mechanical switch 4, and a load 5.

Under normal operation of the first AC source 1, power is supplied from the first AC source 1 to the load 5 while the first switch 3 is dosed, and the second switch 4 is open. In the event that the first AC source 1 is service-interrupted, the continuous power supply ceases. Accordingly, after the first switch 3 is opened, the switch 4 is closed, whereby power is supplied from the second AC source 2 to the load 5 via the switch 4. Thus, power is continuously supplied to the load 5.

However, since the first switch 3 and the second switch 4 are mechanical switches, it takes more than fifty or sixty ms (milliseconds) for the switching. Accordingly, problematically, when the load is circuit-changed, interruption can not be avoided, and undesirable effects on the load can not be prevented.

For higher speed, a switch of which the operation mechanism uses a spring has been developed. However, the opening operation can be performed at a higher speed, but the speed of the closing operation can not be enhanced. Problematically, the switching time as a whole of several cycles can not be avoided.

Related Art 2

FIG. 14 shows another conventional power supply system switching device which is described in "15 kV, Medium Voltage Static Transfer Switch" (IEEE, 1995, May/June). This device is a power supply system switching device using a thyristor switch instead of a mechanical switch in order to secure high speed switching between the power supply systems. FIG. 14 shows a first thyristor switch 6 comprising a pair of thryristors connected in inverse-parallel to each other, and a second thyristor switch 7 comprising a pair of thyristors connected in inverse-parallel to each other.

Under normal operation of the first AC source 1, gate signals are continuously given to the thyristor pair of the first thyristor switch 6, so that the thyristor switch 6 is kept closed, while the other hand, no gate signals are given to the thyristor pair of the second thyristor switch 7, so that the second thyristor switch 7 is kept open. Thereby, power is supplied to the load 5 from the first AC source 1 via the first thyristor switch 6.

In the event that the first AC source 1 is service-interrupted, the application of the gate signals to the thyristor pair of the first thyristor switch 6 immediately ceases. After the first thyristor switch 6 is opened at the time when the current flowing in the thyristor reaches the zero point, gate signals to the thyristor pair of the second thyristor switch 7 are applied close that second thyristor to switch 7. Thereby, power is supplied from the second AC source 2 to the load 5 via the second thyristor switch 7.

When such a thyristor switch as described above is used, switching from the first AC source 1 to the second AC source 2 can be performed within a half cycle. Therefore, characteristically, at service-interruption of the first AC source 1, switching to the second AC source 2 can be made without undesirably affecting the load 5.

However, in the above-described system, load current invariably flows through the thyristors. Therefore, there arises the problem that the power loss caused by the internal loss of the thyristors is increased, and the operation cost becomes high due to the generated power loss. Further, problematically, a large-sized cooling device is required since the thyristor elements have to be quenched. Thus, there arises the problem that the switching device has a large-size, and is expensive.

As regards the conventional devices of these types, as described above, those provided with mechanical switches take much time to make a transfer. On the other hand, devices provided with thyristor switches are problematic with regard to power loss, heating, and so forth.

SUMMARY OF THE INVENTION

Accordingly, it is an object of the present invention to solve the above-described problems and provide a power supply system switching device which is compact in size and is inexpensive, and can switch from a power supply system to another power supply system without service interruption in the event that the power supply system is disturbed, of which the loss to be generated under conduction can be considerably reduced, significantly decreasing the operation cost, and in which in switching of two different power supply systems by use of a thyristor switch, one thyristor switch can be used in common to switch from one power supply system to the other power supply system and moreover, to switch in the opposite direction, and a method of switching between power supply systems.

According to the present invention, there is provided a power supply system switching device which comprises a first mechanical bypass switch connected in series with a first power supply system, a second mechanical bypass switch connected in series with a second power supply system, a semiconductor switch connected in parallel to the second bypass switch, a load connected to the connection point of the first bypass switch, the second bypass switch, and the semiconductor switch, and a controller for on-off controlling the two bypass switches and the semiconductor switch so that either one of the two power supply systems is selected to supply power to the load by operation of switching between the two bypass switches, the controller, when the power is switched from the first power supply source to the second power supply source, causing the first bypass switch to open and the semiconductor switch connected in parallel to the first bypass switch to conduct whereby the current flowing through the first bypass switch is commutated so as to flow through the semiconductor switch, and thereafter, causing the second bypass switch to close, whereby the load is switched so as to be connected to the second power supply system.

Preferably, in the power supply system switching device of the present invention, the semiconductor switch comprises a pair of semiconductor switches connected in inverse-parallel to each other, and the controller comprises a bypass switch opening section for opening the first bypass switch, a current/voltage detection section for detecting the direction or voltage-polarity of current flowing through the first bypass switch, a first turning-on section for turning on one of the switch elements of the semiconductor switch based on the detection results obtained by the current/voltage detection section, a second turning-on section for turning on both of the switch elements of the semiconductor switch a predetermined period later than the time when the current flowing at the first bypass switch becomes zero, a bypass switch closing-section for closing the second bypass switch a predetermined period later than the time when both of the switch elements of the semiconductor switch are turned on, and a turning-off section for turning off both of the switch elements of the semiconductor switch a predetermined period later than the time when the second bypass switch is closed.

Also preferably, the power supply system switching device for switching between the first and second power supply systems in both directions further comprises a circuit-changing switch for circuit-changing the semiconductor switch to connect selectively in parallel to one of the first and second bypass switches, wherein the semiconductor switch comprises a pair of semiconductor switch elements connected in inverse-parallel to each other, the controller comprises a bypass switch opening section for opening one of the first and second bypass switches, a current/voltage detection section for detecting the directions or voltage-polarities of currents flowing through the first bypass switch and the second bypass switch, a first turning-on section for turning on one of the switch elements of the semiconductor switch based on the detection results obtained by the current/voltage detection section, a second turning-on section for turning on both of the switch elements of the semiconductor switch a predetermined period later than the time when the current flowing through the one bypass switch becomes zero, a bypass switch closing-section for closing the other bypass switch a predetermined period later than the time when both of the switch elements of the semiconductor switch are turned on, a turning-off section for turning off both of the switch elements of the semiconductor switch a predetermined period later than the time when the other bypass switch is closed, and a switch circuit-changing section for switching the circuit-changing switch from the other bypass switch side to the one bypass switch side.

In the power supply system switching device of the present invention, the controller may be provided with control circuits separate for each of the switching directions of the power supply systems.

Further, in the power supply system switching device of the present invention, the controller may comprise one control circuit, and a connection-switching circuit for switching an external input-output depending on the switching directions of the power supply systems.

Preferably, in the power supply system switching device of the present invention, the current/voltage detection section is externally provided with current detection current-transformers for detecting current flowing through the bypass switches, and the first turning-on section turns on one of the switch elements of the semiconductor switch, based on the detection results of the current directions.

Also preferably, in the power supply system switching device of the present invention, the current/voltage detection section is externally provided with voltage detectors for detecting the voltage polarities at the both ends of the respective bypass switches, and the first turning-on section turns on one of the switch elements of the semiconductor switch, based on the detection results of the voltage polarities.

Preferably, in the power supply system switching device of the present invention, the second turning-on section is externally provided with a voltage detector for detecting the voltage across the both-ends of the semiconductor switch, and based on the state of the applied interpole voltage, it is decided whether current through the bypass switch is zero or not.

Also, in the power supply system switching device of the present invention, the semiconductor switch may comprise a pair of thyristor switches connected in inverse-parallel to each other.

According to the present invention, there is provided a method of switching between power supply systems in which power to a load is switched from a first power supply system to a second power supply system, the load being connected to the connection point of first and second mechanical bypass switches connected in series with the first and second power supply systems, respectively, and a semiconductor switch connected in parallel to the second bypass switch, comprises the steps of opening the first bypass and causing a semiconductor switch to conduct whereby current through the first bypass switch is commutated to flow through the semiconductor switch, and closing the second bypass switch, whereby the load is switched to be connected to the second power supply system.

Preferably, the method of switching between power supply systems, wherein the semiconductor switch comprises a pair of semiconductor switch elements connected in inverse-parallel to each other, comprises the steps of opening the first bypass switch, turning on one of the switch elements of the semiconductor switch based on the current direction or voltage-polarity of current flowing through the first bypass switch, turning on both of the switch elements of the semiconductor switch a predetermined period later then the time when the current through the first bypass switch becomes zero, closing the second bypass switch a predetermined period later than the time when both of the switch elements of the semiconductor switch are turned on, and turning off both of the switch elements of the semiconductor switch a predetermined period later than the time when the second bypass switch is closed.

Also preferably, the method of transferring between the first and second power supply systems in both directions, wherein a circuit-changing switch for circuit-changing the semiconductor switch to connect selectively in parallel to either one of the first and second bypass switches is further provided, and wherein the semiconductor switch comprises a pair of semiconductor switch elements connected in inverse-parallel to each other, comprises the steps of opening one of the first and second bypass switches, turning on one of the switch elements of the semiconductor switch, based on the current directions or voltage polarities of currents flowing through the first and second bypass switches, turning on both of the switch elements of the semiconductor switch a predetermined period later than the time when current flowing through said one bypass switch becomes zero, closing the other bypass switch a predetermined period later than the time when both of the switch elements of the semiconductor switch are turned on, turning off both of the switch elements of the semiconductor switch a predetermined period later than the time when the other bypass switch is closed, and switching the circuit-changing switch from the other bypass switch side to the one bypass switch side.

As the bypass switch employed in the static different systems switching device according to the present invention, a switch which uses a spring operation system to realize a high opening-characteristic, that is, an opening time=abut 5 ms is applied. On the other hand, for turning-on of this switch, a relatively long time, that is, about 50 ms, is required, due to the mechanical restrictions. Therefore, turning-on of the bypass switches is carried out by means of the thyristor switches connected in inverse-parallel to each other so that the turning-on can be performed without 2 ms. By this combination, two different power supply systems can be switched at a high speed of up to ½ cycle. In addition, switching between the two power supply systems in both directions can be performed by using one thyristor switch in common. That is, a very economical device can be realized.

In the power supply system switching device of the present invention, under normal conduction, the thyristors are off, and current flows through the bypass switch side. Therefore, the steady conduction loss of the thyristors can be reduced to zero, and moreover, switching of the two different power supply systems in both directions can be performed by using one thyristor switch in common. Accordingly, a power supply system switching device and a method of switching between the power supply systems presenting a low loss and being economical can be provided.

DESCRIPTION OF THE PREFERRED EMBODIMENT

Figure 1:
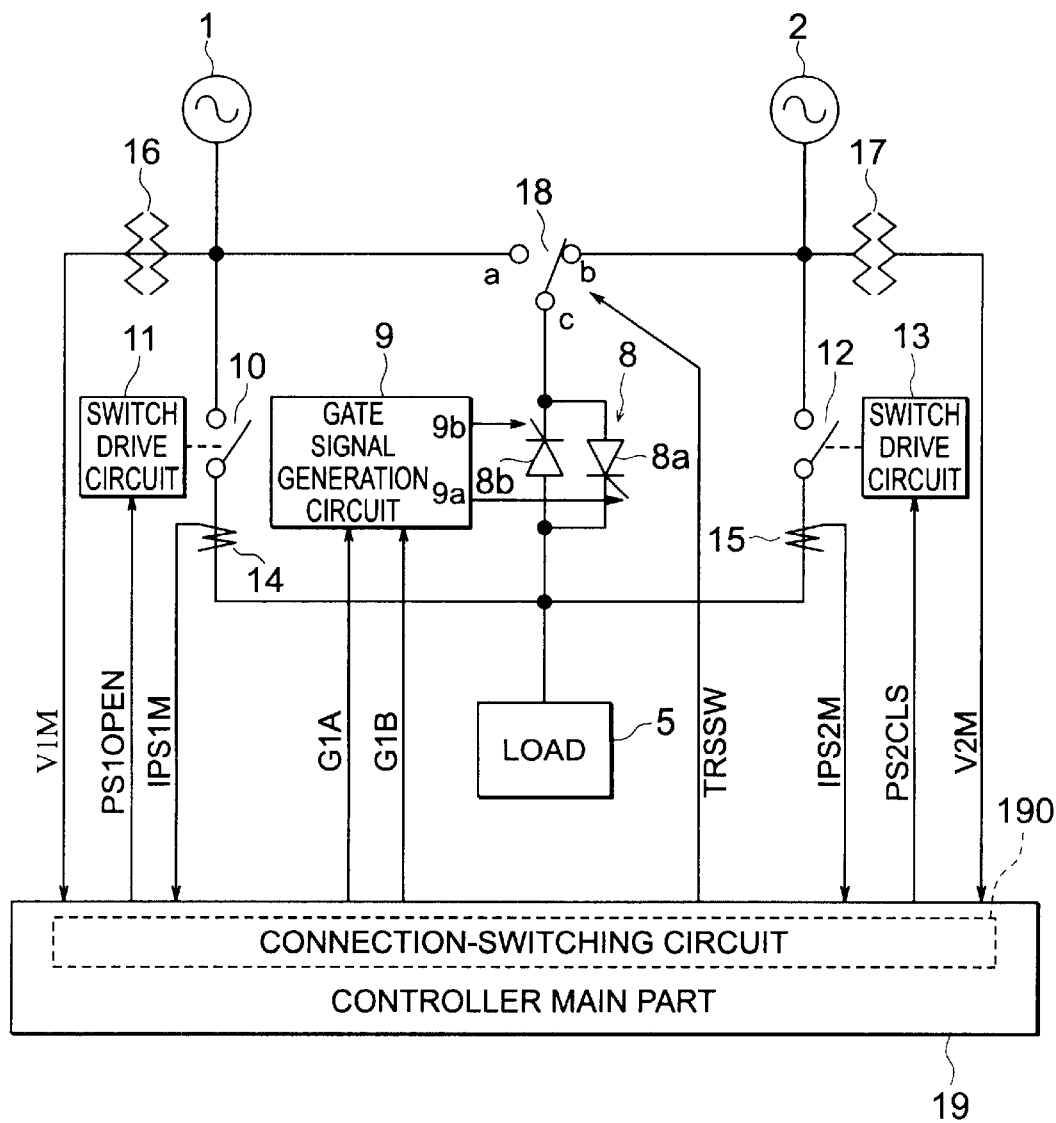
FIG. 1 illustrates the configuration of a power supply system switching device according to an embodiment of the present invention.

FIG. 1 shows the configuration of a power source system switching device according to an embodiment of the present invention. In FIG. 1, the same or equivalent parts are designated by the same reference numerals. In FIG. 1, shown are a semiconductor switch 8 as a semiconductor switch, comprising a pair of thyristors 8a and 8b, which are semiconductor switch elements, for example, connected in inverse-parallel to each other, a gate signal generation circuit for giving gate signals to the thyristors 8a and 8b, a first bypass switch 10, a switch drive circuit 11 for driving the first bypass switch 10, a second bypass switch 12, and a switch drive circuit 13 for driving the second bypass switch 12. The first and second bypass switches are mechanical ones.

Further, in FIG. 1, shown are a current-detection current-transformer (CT) 14 for detecting current flowing through the first bypass switch 10, a current-detection CT 15 for detecting current flowing the second bypass switch 12, a voltage-detection transformer (PT) 16 for detecting the voltage of a first AC source 1, which is a first power supply system, a voltage-detection PT 17 for detecting the voltage of a second AC source 2, which is a second power supply system, a circuit-changing switch 18, and a controller main part 19 for controlling the first, second bypass switches 10 and 12, and the thyristor switch 8 based on the detection results by the above CT's and PT's.

Figure 2:
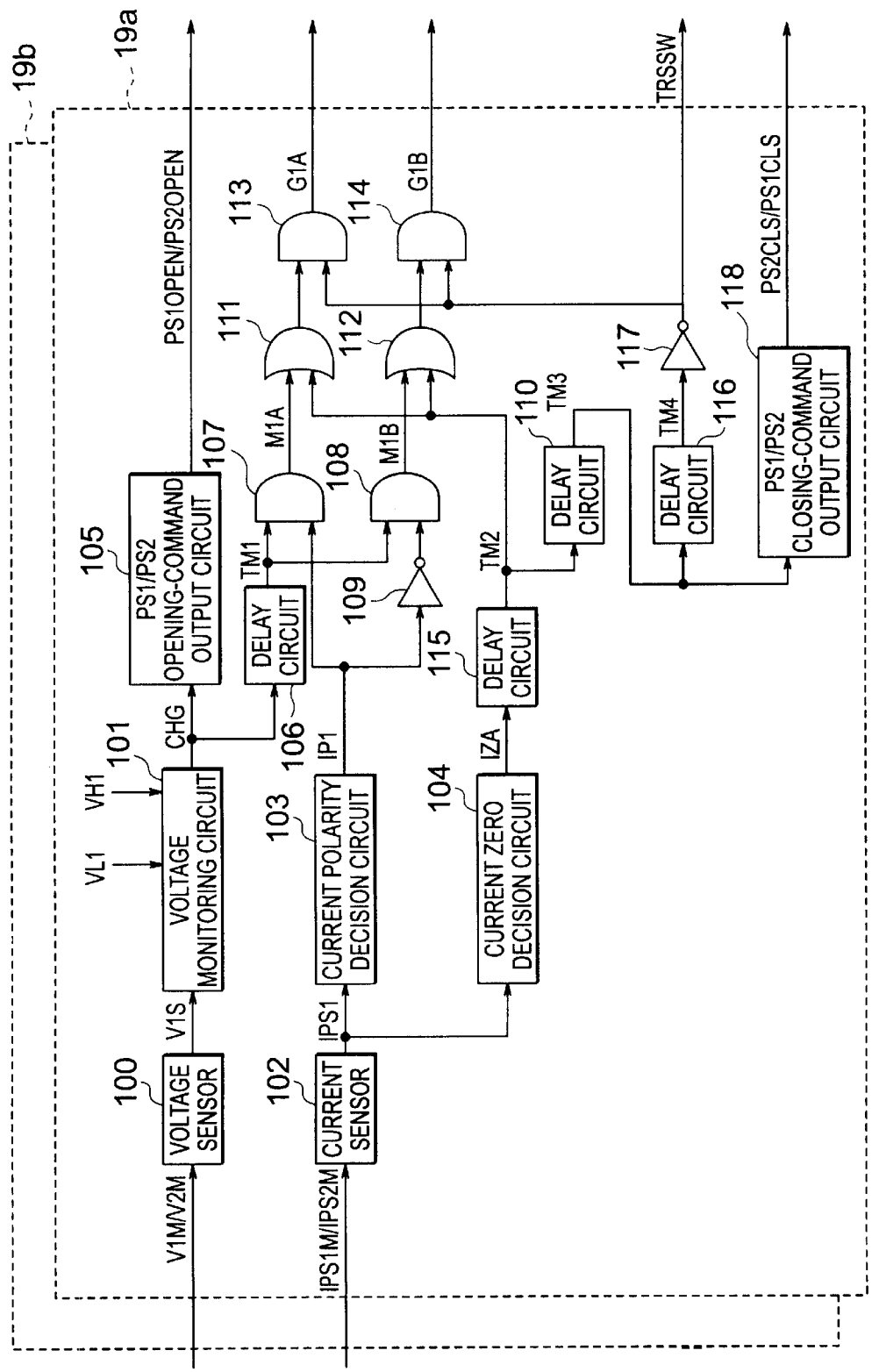
FIG. 2 illustrates an example of a specific configuration of a controller main part shown in FIG. 1.

FIG. 2 illustrates an example of a specific configuration of the controller main part 19. In FIG. 2, shown are a voltage sensor 100 receiving a detection signal VIM from the voltage detection PT 16, and operating the voltage effective value, and a voltage-monitoring circuit 101 for monitoring the level of the detected voltage effective value, and outputting a switching command CHG when the output V1S from the voltage sensor is outside the predetermined voltage lower-limit VL1 and upper-limit VH1.

Further, in FIG. 2, shown are a current sensor 102 for determining a current instantaneous waveform based on the detection signal IPS1M of the above-described current detection CT 14, and a current polarity decision circuit 103 for deciding the current polarity based on the output signal IPS1 from the current sensor 102, outputting an output signal IP1=binary 1 when current at the bypass switch 10 flows from the AC source 1 side to a load 5, or outputting an output signal IPI=binary 0 when the current flows from the load 5 side to the AC source 1 side.

Moreover, shown are a current zero decision circuit 104 for deciding whether current at the bypass switch 10 is zero or not, and a PS1 opening-command output circuit for outputting an opening command signal PS1OPEN which causes the bypass switch 10 to open when the output CHG from the above-mentioned voltage monitoring circuit 101 goes to a 1.

Still further, shown are a delay circuit 106, AND circuits 107 and 108, a NOT circuit 109, a delay circuit 110, and OR circuits 111 and 112. Moreover, shown are AND circuits 113 and 114, delay circuits 115 and 116, a NOT circuit 117, and a PS2 closing-command output circuit 118 for outputting a bypass switch 12 closing-command signal PS2CLS.

In FIGS. 1 and 2, the gate signal generation circuit 9, the switch drive circuits 11 and 13, the current detection current-transformers 14 and 15, the voltage detection transformers 16 and 17, the circuit-changing switch 18, and the controller main part 19 constitute a controller.

Further, the voltage detection transformers 16 and 17, the voltage sensor 100, the voltage monitoring circuit 101, the PS1/PS2 opening-command output circuit 105, and the switch drive circuits 11 and 13 constitute a bypass switch opening-section. The current detection current-transformers 14 and 15, and the current sensor 102 constitute a current/voltage detection section. The current polarity decision circuit 103, the delay circuit 106, the AND circuits 107, 108, 113, and 114, the OR circuits 111 and 112, the NOT circuit 109, and the gate signal generation circuit 9 constitute a first turning-on section. The current zero decision circuit 104, the delay circuit 115, the OR circuits 111 and 112, and the AND circuits 113 and 114, and the gate signal generation circuit 9 constitute a second turning-on section. The delay circuit 110, the PS2/PS1 closing-command output circuit 118, and the switch drive circuits 11 and 13 constitute a bypass switch closing-section. The delay circuit 116, the NOT circuit 117, and the AND circuits 113 and 114 constitute a turning-off section. The delay circuit 116, the NOT circuit 117, and the circuit-changing switch 18 constitute a switch change-over section.

Next, the operation shown in FIGS. 1 and 2 will be described in reference to the operation wave-forms shown in FIGS. 3A–3R, as an example. The operation conditions in the respective operation steps will be described in reference to FIGS. 4 to 8 so that the operation of the present invention may be appreciated more clearly.

(1) Operation in Steady State

Figure 4:
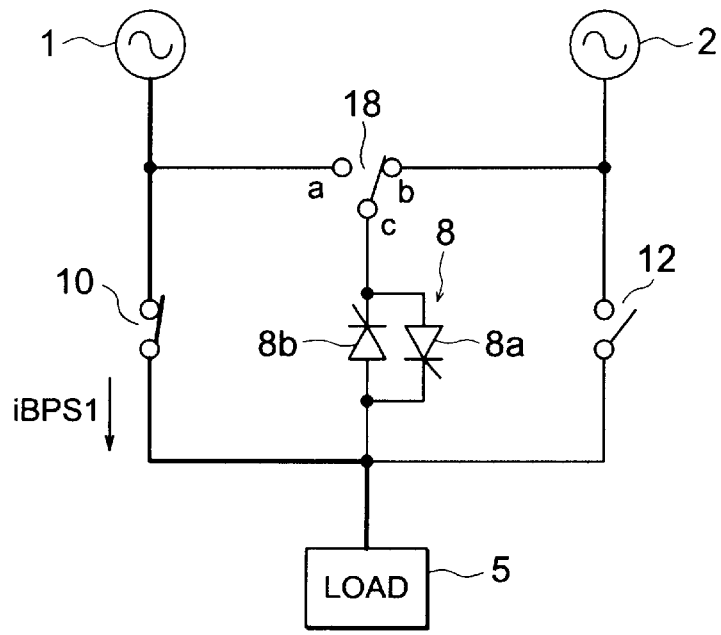
FIG. 4 illustrates the state of the device shown in FIG. 1 before switching.

First, operation in the steady state will be described in reference to FIG. 4. In FIG. 4, the first bypass switch 10 is in the closed state, and the second bypass switch 12 is in the open state. The thyristor switch 8, not given a gate signal, is in the open state. The terminals b and c of the circuit-changing switch 18 are in the connection state. Accordingly, power is supplied from the first AC source 1 through the first bypass switch 10 to the load 5, as shown by the bold line in FIG. 4.

(2) Description of the Switching Operation

Figure 3:
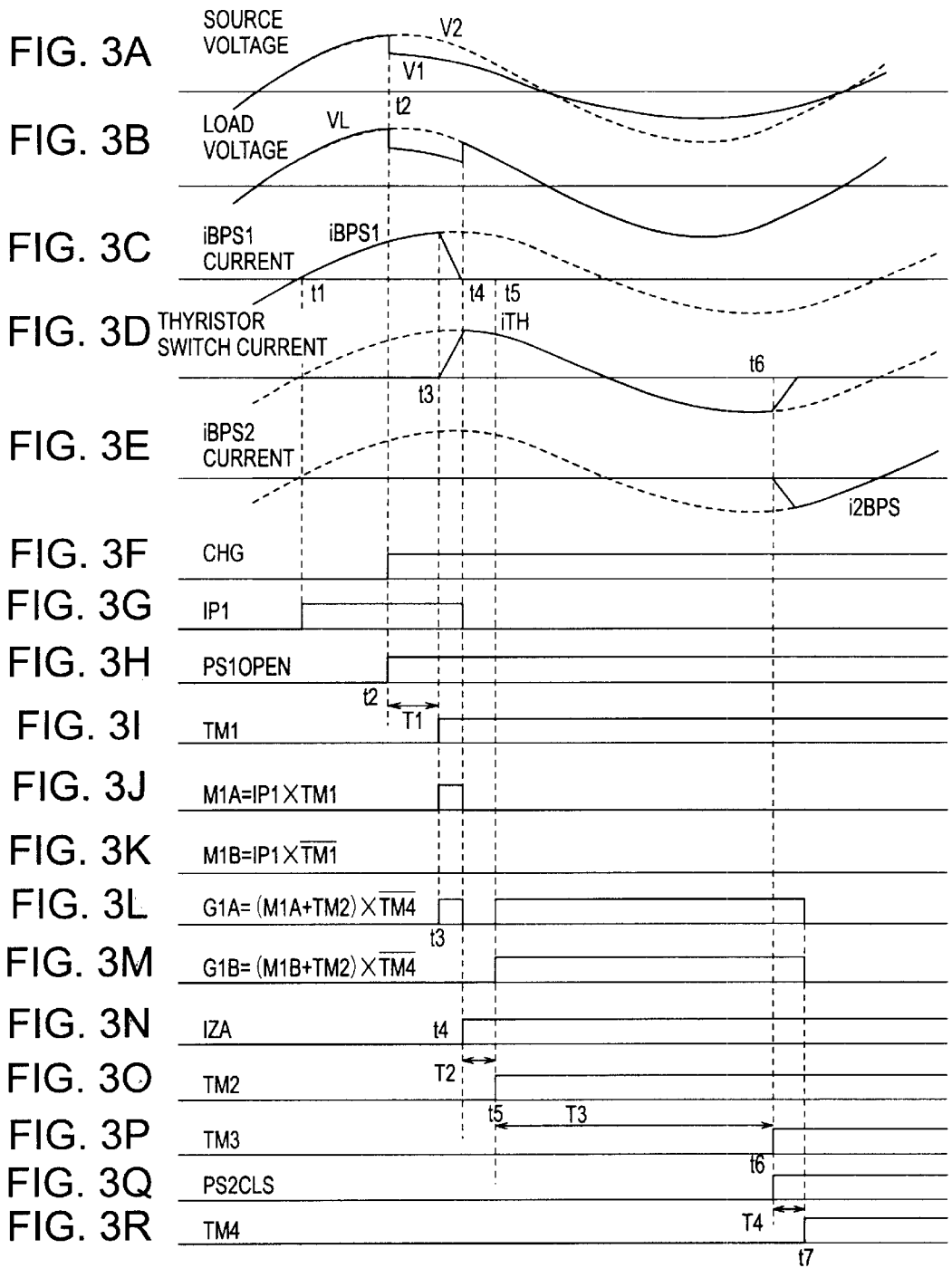
FIGS. 3A to 3R are waveform charts for the device shown in FIGS. 1 and 2.

Next, the operation of switching from the AC source 1 side to the AC source 2 side, carried out when the voltage of the AC source 1 is reduced, for example, will be described in reference to FIGS. 2 to 8. The case where the voltage V1 of the AC source 1 is reduced at time t2 as shown in FIG. 3A will be discussed. The voltage V1 of the AC source 1 is detected by the voltage detection PT 16, the effective value of the voltage is operated by the voltage sensor 100, and the operation results V1S are input to the voltage monitoring circuit 101.

The voltage monitoring circuit 101 compares the V1S with the upper limit VH1 and the lower limit VL1, and outputs a 1 as the switching-command signal CHG when V1S>VH1 or V1S<VL1. Accordingly, the switching-command signal CHG goes to a 1 at the time t2, as shown in FIG. 3F. When the CHG goes to a 1, the operation of switching from the AC source 1 to the AC source 2 is carried out via the following five STEPS.

STEP-1

Figure 5:
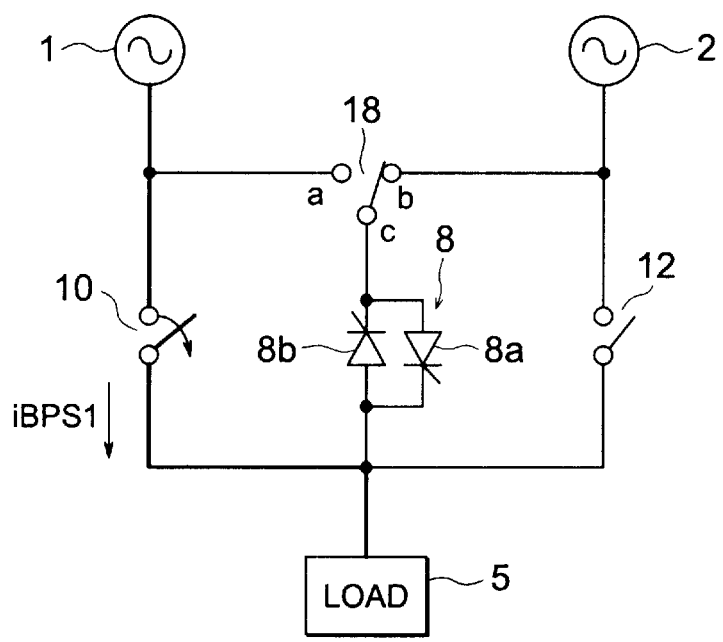
FIG. 5 illustrates the opening-state of a bypass switch 10 of the device of FIG. 1.

In STEP-1, the bypass switch 10 is opened as shown in FIG. 5. Details of this operation will be concretely described below. In FIG. 2, when the switching-command signal CHG goes to a 1, it causes the PS1 opening-command output circuit 105 to operate and output an opening-command signal PS1OPEN to the drive circuit 11 for the bypass switch 10, as shown in FIG. 3H. In the bypass switch 10, contact parting operation starts when the opening-command signal PS1OPEN is input, On the other hand, current iBPS1 flowing through the bypass switch 10 is detected by the current detection CT 14, which inputs a detection signal IPS1M to the current sensor 102. In the current sensor 102, the detection signal IPS1M is converted to a control signal proportional to the current flowing through the bypass switch 10, and the output IPS1 is input to the current polarity decision circuit 103. The current polarity decision circuit 103 outputs an output signal IPS=binary 1, when the current at the bypass switch 10 flows in the direction of from the AC source 1 side toward the load 5, and outputs an output signal IP1=binary 0, when the current flows from the load 5 side to the AC source 1 side, FIG. 3C shows the current flowing through the bypass switch 10. The current has a positive polarity during the period from time t1 to time t4, that is, the current flows from the AC source 1 to the load 5. During this period, the output IP1 from the current polarity decision circuit 103 is a 1, as shown in FIG. 3G.

STEP-2

Figure 6:
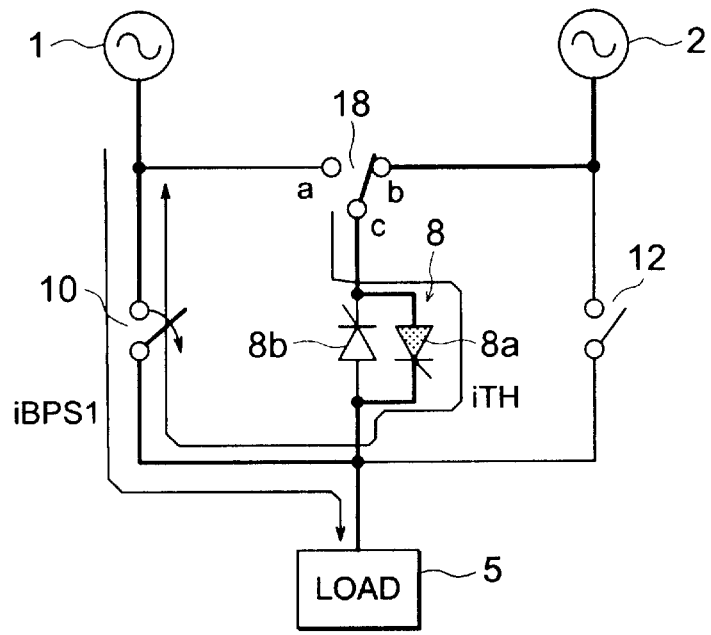
FIG. 6 illustrates the off-state of the bypass switch 10 caused by the selective turning on of the thyristor shown in FIG. 1.
Figure 7:
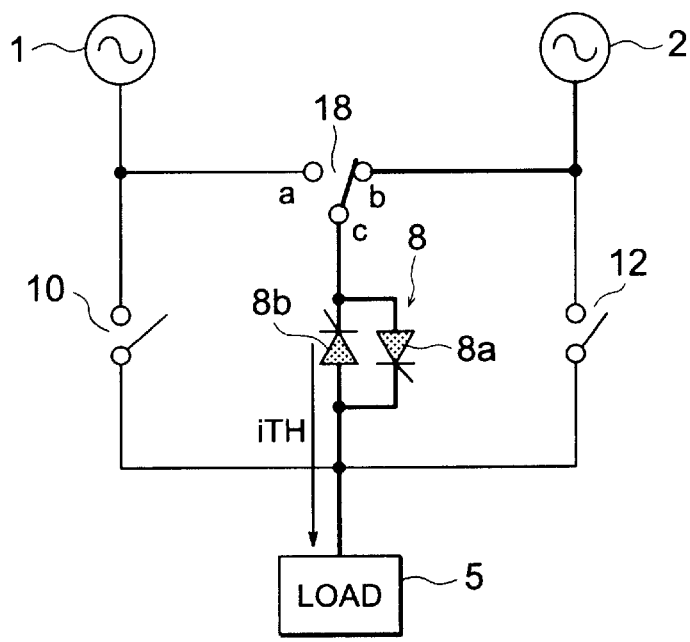
FIG. 7 illustrates the on-state of both of the thyristor switch elements of the device shown in FIG. 1.

In STEP-2, after a predetermined period from the time when the contact-parting operation starts to the time when a pole-distance required to get a sufficient insulation performance between the poles is attained, the operation of switching from the AC source 1 to the AC source 2 with respect to the load 5 is started, as shown in FIG. 6, by selectively turning on either one of the thyristors 8a and 8b of the thyristor switch 8 mainly based on such logical conditions as described below.

For this purpose, in the control circuit shown in FIG. 2, the delay circuit 106 outputs TM1=binary 1 a predetermined period T1 later than the time when the output CHG from the voltage monitoring circuit 101 goes to a 1, as shown in FIG. 3I. The period T1 is set under consideration of the period till the insulation distance between the poles of the bypass switch 10 is sufficiently secured. After the period T1 is past, the insulation of the bypass switch 10 is durable with no troubles, even when the thyristor of the thyristor switch 8 is turned on, and the voltage on the AC source 2 is applied across the poles of the bypass switch 10. Therefore, at time t3, either one of the paired thyristors of the thyristor switch 8 is selectively turned on.

In this case, it is determined based on the requirements for the short-circuiting conditions between the AC source 1 and the AC source 2 to fail which thyristor 8a or 8b of the thyristor pair is selected. The logical operation is executed by the AND circuits 107 and 108 according to the following logic.

$$M1A = IP1 \times TM1$$

$$M1B = IP1\,(\mathrm{bar}) \times TM1 \tag{1}$$

M1A and M1B represent outputs from the AND circuits 107 and 108, respectively. The symbol × represents the AND logical operation.

The M1A and M1B from the AND circuits 107 and 108 are input to the AND circuits 113 and 114 via the OR circuits 111 and 112, respectively. The output G1A from the AND circuit 113 acts as a drive command of the gate drive 9a to turn on the thyristor 8a. The output G1B from the AND circuit 114 acts as a drive command of the gate drive 9b to turn on the thyristor 8b. The logical equations of these AND circuits are composed as follows.

$$G1A = (M1A + TM2) \times TM4 \text{ (bar)}$$
$$G1B = (M1B + TM2) \times TM4 \text{ (bar)} \qquad (2)$$

Hereupon, TM4 represents a timing signal for stopping the gate pulse as described later.

As seen in FIGS. 3M and N, the G1A goes to a 1 at the time t3 by executing the logical equations (2) and outputting the G1A and the G1B, and selectively drives the gate drive 9a for the thyristor 8a side to turn on the thyristor 8a. The current flowing through the bypass switch 10 is counteracted by the current flowing-in from the AC source 2 side to be zero at the time t4 as shown in FIG. 3C. At this point, the contacts of the bypass switch 10 have been sufficiently parted, so that the current is interrupted at a current zero point (time t4).

In the logic operation system according to the present invention, the current direction of the thyristor 8a which is selected by the logic operation according to the equations (2) can be securely made opposite to that of the bypass switch 10. Therefore, there is no danger that the AC source 1 and the AC source 2 are short-circuited, when the thyristor 8a is turned on at the time t3 under conduction of the bypass switch 10.

STEP-3 (Switching to Thyristor Switch 8)

In STEP-3, current at the bypass switch 10 is monitored. When it is determined that the current is zero, and the bypass switch 10 is completely non-conducting, both of the gate signals for the thyristors 8a and 8b of the thyristor switch 8 are turned on, so that both of the thyristors 8a and 8b of the thyristor switch 8 are caused to conduct and are completely turned on.

This operation will be described with reference to FIGS. 2 and 3. The thyristor 8a is turned on at the time t3 in STEP-3. At this point, the voltage V2 of the AC source 2 is higher than the voltage V1 of the AC source 1. Therefore, the current flowing through the thyristor 8a acts so as to counteract the current flowing through the bypass switch 10. As shown in FIG. 3C, the current at the bypass switch 10 starts to be decreased at the time t3, and becomes zero at the time 4. On the other hand, as shown in FIG. 3D, the current of the thyristor 8a starts to be increased at the time t3, and becomes equal to the load current at the time t4. Thereafter, all of the load current is caused to flow through the thyristor 8a.

The current at the bypass switch 10 is detected by the current detection CT 14. In the current sensor 102, the detection signal IPS1M is converted to a current absolute value signal IPS1 proportional to the current intensity. In the current zero decision circuit 104 at the next stage, it is decided whether the current of the IPS1M is zero or not. When the current=zero is set up, IZA=binary 1 as a current zero decision signal is output. Further, when current≠zero, IZA=binary 0 is output.

In the example of FIGS. 3A to 3R, the current of the bypass switch 10 becomes zero at the time 4, as shown in the waveform of FIG. 3C, and therefore, the IZA goes to a 1 at the time t4, as shown in FIG. 3O.

The output IZA from the current zero decision circuit 104 is input to the delay circuit 115. The delay circuit 115 monitors a period T2 from the time when current at the bypass switch 10 becomes zero to the time when the off performance of the bypass switch 10 is completely restored, and makes an output TM2 from the delay circuit 115 a 1 at the time t5 which is the period T2 later than the time t4 when the IZA goes to a 1. When the TM2 goes to a 1, it can be decided that the bypass switch 10 is completely in the off state. Therefore, gates signals are given to both of the thyristors 8a and 8b: to be turned on, respectively.

For this purpose, the output TM2 is input to the OR circuits 111 and 112, and as shown in FIGS. 3M and 3N, both of the G1A and the G1B are is after the time t5. Therefore, both of the gate drives 9a and 9b are driven so that gate signals are given to both of the thyristors 8a and 8b, respectively.

As a result, power can be continuously supplied through the thyristor switch 8 to the load 5 from the AC source 2 side.

STEP-4

Figure 8:
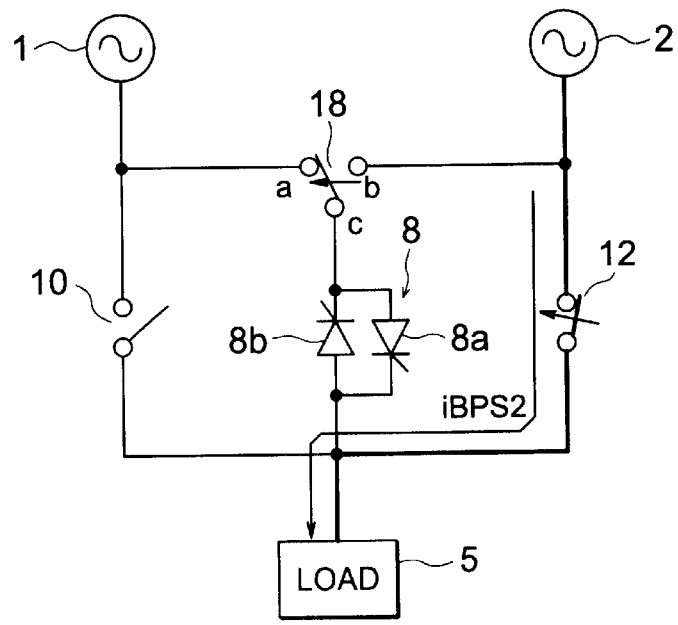
FIG. 8 illustrates the closing of a bypass switch 12 of the device shown in FIG. 1 and the circuit-change of a switch 18 thereof.

In STEP-4, in order to remove a loss generated by the conduction of the thyristors, the second bypass switch 12 is closed a predetermined time T3 later than the time t5 when the thyristor switch 8 is completely turned on, as shown in FIG. 8, so that the current is commutated to the bypass switch 12 side. This operation will be described below.

In the delay circuit 110, at the time t6 which is the predetermined period T3 later than the time t5, the bypass switch closing-command PS2CLS is made a 1, as shown in FIG. 3R. As a result, the second bypass switch 12 is turned on, so that the current through the thyristor switch 8 is commutated to the bypass switch 12. Therefore, as shown in FIGS. 3D and 3E, the current at the thyristor switch 8 is zero, and all of the load current flows through the second bypass switch 12.

Further, the gate signals for the thyristor switch 8 are ceased when the period T4 has been secured which is sufficient for the current at the thyristor switch 8 to be completely commutated to the bypass switch 12, after the bypass switch closing-command PS2CLS goes to a 1.

For this purpose, the delay circuit 116 is provided. The delay circuit 116 outputs a 1 signal as TM4, the period T4 later than the time when the bypass switch closing-command PS2CLS goes to a 1. The signal is input to the AND circuits 113 and 114 via the NOT circuit 117. As a result, the outputs G1A and G1B from the AND circuits 113 and 114 go to a 0 at time t7 as shown in FIGS. 3M and 3N, and the gate signals are ceased to be fed to the thyristor switch 8. That is, the switching operation is completed.

STEP-5 (Connection Changing of Thyristor Switch)

After switching from the bypass switch 10 to the bypass switch 12 is completed, the circuit-changing switch 18 are switched so that the terminals a and c are connected to each other, in order to correspond the next switching in the reverse direction, that is, from the AC source 2 to the AC source 1 (switching from the bypass switch 12 to the bypass switch 10). For this purpose, an output TRSSW from the NOT circuit 117 shown in FIG. 2 may be used. Thus, the switching operation is completed.

The above-described control causes the load voltage VL applied to the load 5 to be voltage-reduced during only the period from the time t2 to the time t4 as shown in FIG. 3B. The load voltage VL after the time t4 can be restored to the normal voltage. Accordingly, no serious effects are given to the load.

In the above-description, the operation of switching from the AC source 1 to the AC source 2 is explained. The operation of switching from the AC source 2 to the AC source 1 is the same as the above operation, and is included by this invention. In this case, two sets of the control circuits 19a and 19b shown in FIG. 2 may be provided. Further, an input and an output with respect to the load may be switched between the AC source 1 side and the AC source 2 side, respectively, as follows. One of the control circuits shown in FIG. 2 is used in common, a connection-changing circuit 190 is provided in the controller main part 19, as shown by the broken line, switching from the AC source 1 to the AC source 2 and that from the AC source 2 to the AC source 1 are carried out, as seen in V1M/V2M, IPS1M/IPS2M, PS1/PS2 opening-command output circuit 105, the PS2/PS1 closing-command output circuit 118, PS10PEN/PS20PEN, and PS2CLS/PS1CLS in FIG. 2.

In the above-described embodiment, the thyristor switch as the semiconductor switch is described. Another semiconductor switch comprising a pair of GTO's or transistors connected in inverse-parallel to each other may be employed.

Second Embodiment

In the above first embodiment, switching between the AC source 1 and the AC source 2 in both directions is described. If switching in one direction is available, the circuit-changing switch 18 can be omitted, and the thyristor switch 8 may be invariably connected to the AC source 2 side. In this case, the same advantages can be also obtained.

Third Embodiment

In the above-described first embodiment, the currents at the bypass switches 10 and 12 are detected, and either one of the thyristors of the thyristor switch 8 is selected based on the polarities of the currents. Further, a bypass switch both-end voltage detection means for detecting a voltage across the both-ends of the bypass switch 10 may be provided, and based on the polarity of the voltage, either one of the thyristors 8a and 8b of the thyristor switch 8 may be selectively turned on.

Figure 9:
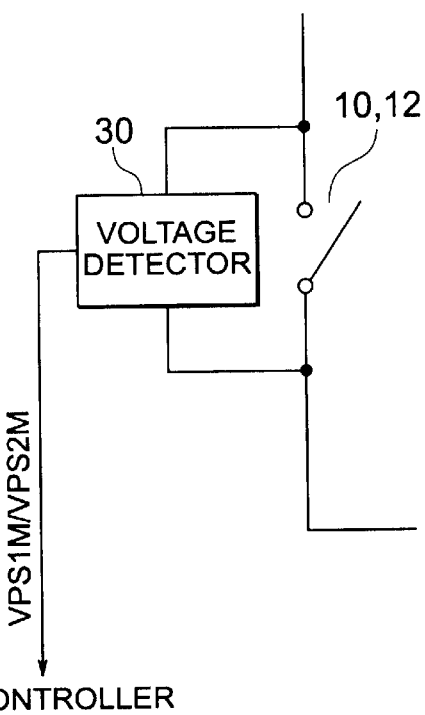
FIG. 9 illustrates a part of a power supply system switching device according to another embodiment of the present invention.
Figure 10:
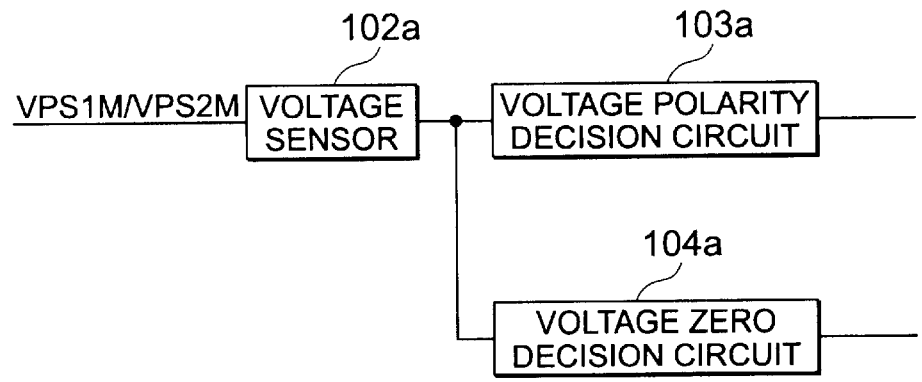
FIG. 10 illustrates a part of a controller main part of the power supply system switching device shown in FIG. 9.

In this case, a voltage detector 30 as the bypass switch both-end voltage detection means is provided in parallel to the bypass switches 10 and 12 as shown in FIG. 9. Further, instead of the parts 102 to 104 shown in FIG. 2, a voltage sensor 102a, a voltage-polarity decision circuit 103a, and a voltage zero decision circuit 105 are used, respectively.

Fourth Embodiment

In the above-described first embodiment, the current at the first bypass switch 10 is detected, the current is detected to be zero, and the thyristor switch 8 is turned on. However, thyristor switch both-end voltage detection means for detecting a voltage across the both ends of the thyristor switch 8 may be provided, and the thyristor switch 8 may be turned on, based on the determination results of the application state of the interpole voltage.

Figure 11:
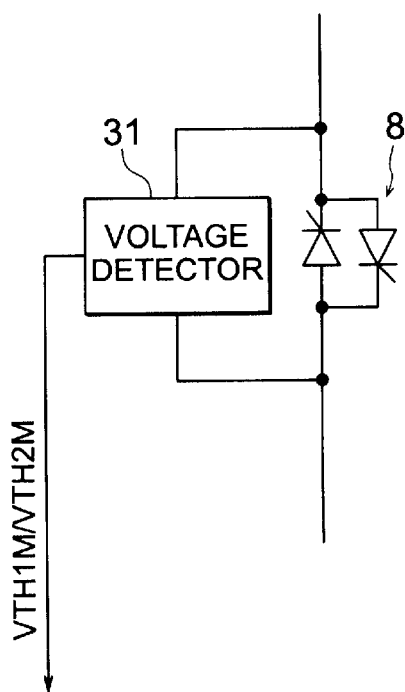
FIG. 11 illustrates a part of a power supply system switching device according to a further embodiment of the present invention.
Figure 12:
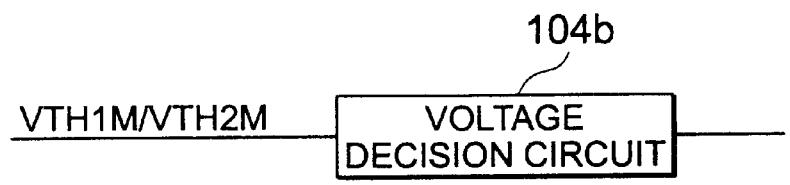
FIG. 12 illustrates a part of a controller main part of the power supply system shown in FIG. 11.
Figure 13:
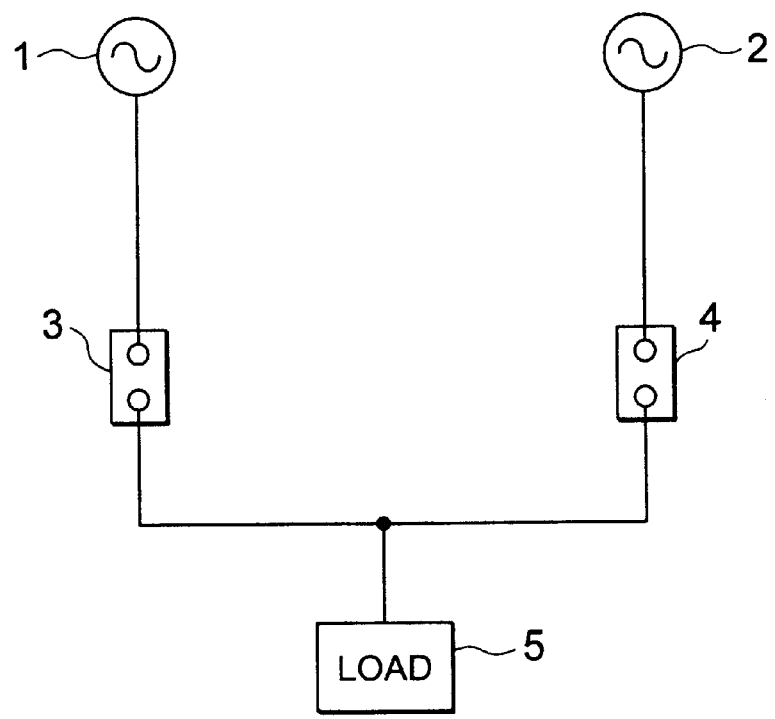
FIG. 13 illustrates a conventional power supply system switching device.
Figure 14:
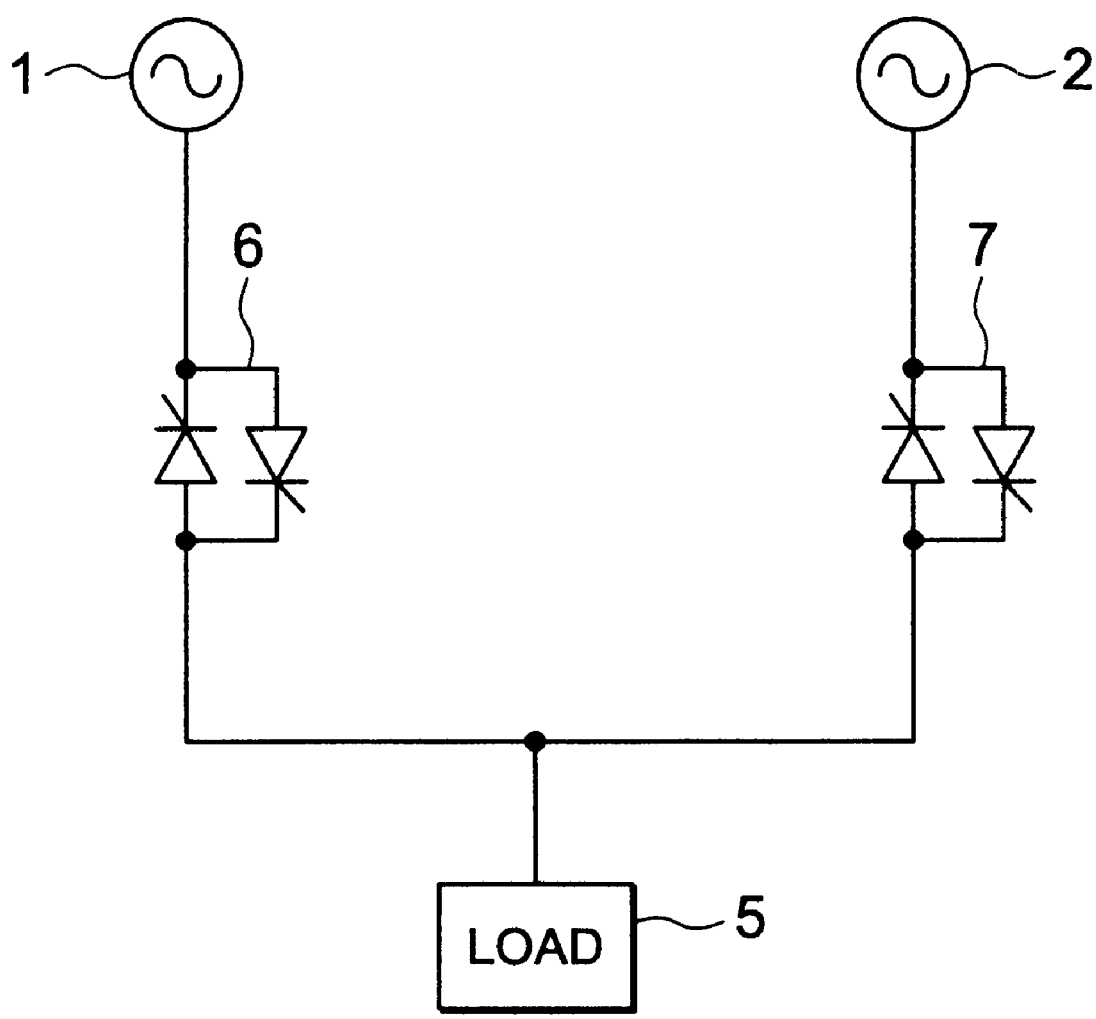
FIG. 14 illustrates another conventional power supply system switching device.

In this case, a voltage detector 31 as the thyristor both-end voltage detection means is provided in parallel to the thyristor switch 8 as shown in FIG. 11. Instead of the part 104 shown in FIG. 2, used is a voltage decision circuit 104b for deciding whether current flowing through the bypass switch is zero or not, based on the application state of the interpole voltage of the thyristor switch 8.

As described above, according to the present invention, the power supply system switching device comprises a first mechanical bypass switch connected in series with a first power supply system, a second mechanical bypass switch connected in series with a second power supply system, a semiconductor switch connected in parallel to the second bypass switch, a load connected to the connection point of the first bypass switch, the second bypass switch, and the semiconductor switch, and a controller for on-off controlling the two bypass switches and the semiconductor switch so that either one of the two power supply systems is selected to supply power to the load by operation of switching between the two bypass switches, the controller, when the power is switched from the first power supply source to the second power supply source, causing the first bypass switch to open and the semiconductor switch connected in parallel to the first bypass switch to conduct whereby current flowing through the first bypass switch is commutated so as to flow through the semiconductor switch, and thereafter, causing the second bypass switch to close, whereby the load is switched so as to be connected to the second power supply system. Since the semiconductor switch is provided in parallel to the bypass switch, current is made to flow through the bypass switch side under normal operation, and for the switching, changing from the bypass switch to the semiconductor switch can be performed at a high speed, a power supply system switching device with a fast response and a low operation loss, which is economical, can be provided.

Preferably, in the power supply system switching device of the present invention, the semiconductor switch comprises a pair of semiconductor switches connected in inverse-parallel to each other, and the controller comprises a bypass switch opening section for opening the first bypass switch, a current/voltage detection section for detecting the direction or voltage-polarity of current flowing through the first bypass switch, a first turning-on section for turning on one of the switch elements of the semiconductor switch based on the detection results obtained by the current/voltage detection section, a second turning-on section for turning on both of the switch elements of the semiconductor switch a predetermined period later than the time when the current at the first bypass switch becomes zero, a bypass switch closing-section for closing the second bypass switch a predetermined period later than the time when both of the switch elements of the semiconductor switch are turned on, and a turning-off section for turning off both of the switch elements of the semiconductor switch a predetermined period later than the time when the second bypass switch is closed. Since the current is made to flow through the bypass switch side while the semiconductor switch is turned off, the steady conduction loss of the semiconductor switch can be reduced to zero. Thus, the loss of the power supply transfer device is low.

Also preferably, the power supply system switching device for switching between the first and second power supply systems in both directions further comprises a circuit-changing switch for circuit-changing the semiconductor switch to connect selectively in parallel to one of the first and second bypass switches, wherein the semiconductor switch comprises a pair of semiconductor switch elements connected in inverse-parallel to each other, the controller comprises a bypass switch opening section for opening one of the first and second bypass switches, a current/voltage detection section for detecting the directions or voltage-polarities of currents flowing through the first and second bypass switches, a first turning-on section for turning on one of the switch elements of the semiconductor switch based on the detection results obtained by the current/voltage detection section, a second turning-on section for turning on both of the switch elements of the semiconductor switch a predetermined period later than the time when current flowing through the one bypass switch becomes zero, a bypass switch closing-section for closing the other bypass switch a predetermined period later than the time when both of the switch elements of the semiconductor switch are turned on, a turning-off section for turning off both of the switch elements of the semiconductor switch a predetermined period later than the time when the other bypass switch is closed, and a switch circuit-changing section for switching the circuit-changing switch from the other bypass switch side to the one bypass switch side. Since current is made to flow through the bypass switch side while the semiconductor switch is turned off, under steady conduction, the steady conduction loss of the semiconductor switch can be reduced to zero. Moreover, since switching between the two different power supply systems in both directions can be realized by using one semiconductor switch in common, the device has a reduced loss and is economical.

In the power supply switching system of the present invention, the controller may be provided control circuits separate for each of the switching directions of the power supply systems. Accordingly, the power supply systems can be switched in both of the directions by no use of an especial switch.

Further, in the power supply system switching device of the present invention, the controller may comprise one control circuit, and a connection-switching circuit for switching an external input-output depending on the switching directions of the power supply systems. Therefore, the control part can be compacted.

Preferably, in the power supply system switching device of the present invention, the current/voltage detection section is externally provided with current detection current-transformers for detecting current flowing through the bypass switches, and the first turning-on section turns on one of the switch elements of the semiconductor switch, based on the detection results of the current directions. Therefore, the switch element of the semiconductor switch to be turned on can be determined, based on the directions of current flowing through the bypass switches.

Preferably, in the power supply system switching device of the present invention, the current/voltage detection section is externally provided with voltage detectors for detecting the voltage polarities at the both ends of the respective bypass switches, and the first turning-on section turns on one of the switch elements of the semiconductor switch, based on the detection results of the voltage polarities. Therefore, it can be decided whether switch element of the semiconductor switch is to be turned on, based on the voltage polarity at the both ends of each bypass switch.

Also preferably, in the power supply system switching device of the present invention, the second turning-on section is externally provided with a voltage detector for detecting the voltage across the both-ends of the semiconductor switch, and based on the state of the applied interpole voltage, it is decided whether current through the bypass switch is zero or not. Thus, it can be decided whether the current at the bypass switch is zero or not based on the state of the applied voltage at the both ends of the semiconductor switch.

Further, in the power supply transfer device, the semiconductor switch may comprise a pair of thyristor switches connected in inverse-parallel to each other. Accordingly, the semiconductor switch of the power supply system switching device can be realized by use of the thyristor switch.

According to the present invention, the method of switching between power supply systems in which power to a load is switched from a first power supply system to a second power supply system, the load being connected to the connection point of first and second mechanical bypass switches connected in series with first and second power supply systems, respectively, and a semiconductor switch connected in parallel to the second bypass switch, comprises the steps of opening the first bypass and causing a semiconductor switch to conduct whereby current through the first bypass switch is commutated to flow through the semiconductor switch, and closing the second bypass switch, whereby the load is circuit-changed to be connected to the second power supply system. The response of the method is fast, and the operation loss is low. The method is economical.

Preferably, the method of switching between power supply systems, wherein the semiconductor switch comprises a pair of semiconductor switch elements connected in inverse-parallel to each other, comprises the steps of opening the first bypass switch, turning on one of the switch elements of the semiconductor switch based on the current direction or voltage-polarity of current flowing through the first bypass switch, turning on both of the switch elements of the semiconductor switch a predetermined period later then the time when the current in the first bypass switch becomes zero, closing the second bypass switch a predetermined period later than the time when both of the switch elements of the semiconductor switch are turned on, and turning off both of the switch elements of the semiconductor switch a predetermined period later than the time when the second bypass switch is closed. Since current is made to flow through the bypass switch side while the semiconductor switch is off, the steady conduction loss of the semiconductor switch can be reduced to zero. That is, the loss of the device is low.

Preferably, the method of switching between the first and second power supply systems in both directions according to the present invention, wherein a circuit-changing switch for circuit-changing the semiconductor switch to connect selectively in parallel to either one of the first and second bypass switches is further provided, and wherein the semiconductor switch comprises a pair of semiconductor switch elements connected in inverse-parallel to each other, and comprises the steps of opening one of the first and second bypass switches, turning on one of the switch elements of the semiconductor switch, based on the current directions or voltage polarities of currents flowing through the first and second bypass switches, turning on both of the switch elements of the semiconductor switch a predetermined period later than the time when current flowing through the one bypass switch becomes zero, closing the other bypass switch a predetermined period later than the time when both of the switch elements of the semiconductor switch are turned on, turning off both of the switch elements of the semiconductor switch a predetermined period later than the time when the other bypass switch is closed, and switching the circuit-changing switch from the other bypass switch side to the one bypass switch side. Under steady conduction, the semiconductor switch is off, and current flows through the bypass switch side. Therefore, the steady conduction loss of the semiconductor switch can be reduced to zero, and also, switching between the two different power supply systems in both directions can be performed by using one semiconductor switch in common. Thus, the loss of the device is low, and the device is economical.

What is claimed is:

1. A power supply system switching device comprising:
   a first mechanical bypass switch connected in series with a first power supply system,
   a second mechanical bypass switch connected in series with a second power supply system,
   a semiconductor switch;
   a circuit-changing switch for switching and selectively connecting the semiconductor switch in parallel with the first and second bypass switches,
   a load connected to a connection point of the first bypass switch, the second bypass switch, and the semiconductor switch, and
   a controller for on-off controlling the first and second bypass switches and the semiconductor switch so that one of the first and second power supply systems is selected to supply power to the load by switching of the first and second bypass switches, the semiconductor switch being switchably connected in parallel with the one of the first and second bypass switches connected to the first and second power supply systems not supplying power to the load, the controller, when switching from power being supplied to the load from the first power supply system to power being supplied from the second power supply system, causing the first bypass switch to open and the semiconductor switch connected in parallel with the second bypass switch to conduct, whereby current formerly flowing through the first bypass switch is initially commutated to flow through the semiconductor switch, causing the second bypass switch to close, whereby the load is switched and connected to the second power supply system, and, thereafter causing the semiconductor switch to be connected in parallel with the first bypass switch.

2. The power supply system switching device according to claim 1, wherein said semiconductor switch comprises a pair of semiconductor switch elements connected in inverse-parallel to each other, and the controller comprises a bypass switch opening section for opening the first bypass switch, a current/voltage detection section for detecting one of direction and voltage-polarity of current flowing through the first bypass switch, a first turning-on section for turning on one of the switch elements of the semiconductor switch based on detection results obtained by the current/voltage detection section, a second turning-on section for turning on both of the switch elements of the semiconductor switch after current flowing through the first bypass switch becomes zero, a bypass switch closing-section for closing the second bypass switch after both of the switch elements of the semiconductor switch are turned on, and a turning-off section for turning off both of the switch elements of the semiconductor switch after the second bypass switch is closed.

3. The power supply system switching device for switching between the first and second power supply systems according to claim 1, wherein the semiconductor switch comprises a pair of semiconductor switch elements connected in inverse-parallel to each other, and the controller comprises a bypass switch opening section for opening a first of the first and second bypass switches, a current/voltage detection section for detecting directions of currents flowing through the first bypass switch and the second bypass switch, a first turning-on section for turning on one of the switch elements of the semiconductor switch based on detection results obtained by the current/voltage detection section, a second turning-on section for turning on both of the switch elements of the semiconductor switch after current flowing through the first of the first and second bypass switches becomes zero, a bypass switch closing-section for closing a second of the first and second bypass switches after both of the switch elements of the semiconductor switch are turned on, a turning-off section for turning off both of the switch elements of the semiconductor switch after the second of the first and second bypass switches is closed, and a switch circuit-changing section for switching the circuit-changing switch from the second of the first and second bypass switches to the first of the first and second bypass switches.

4. The power supply system switching device according to claim 3, wherein the controller includes separate control circuits for each of switching directions of the first and second power supply systems.

5. The power supply system switching device according to claim 3, wherein the controller comprises a single control circuit, and a connection-switching circuit for switching an external input-output depending on switching directions of the first and second power supply systems.

6. The power supply system switching device according to claim 2, wherein the current/voltage detection section includes current detection current-transformers for detecting the currents flowing through the first and second bypass switches, and the first turning-on section turns on one of the switch elements of the semiconductor switch based on detected current directions.

7. The power supply system switching device according to claim 3, wherein the current/voltage detection section includes current detection current-transformers for detecting the currents flowing through the first and second bypass switches, and the first turning-on section turns on one of the switch elements of the semiconductor switch based on detected current directions.

8. The power supply system switching device according to claim 2, wherein the current/voltage detection section includes voltage detectors for detecting the voltage polarities of the respective first and second bypass switches, and the first turning-on section turns on one of the switch elements of the semiconductor switch, based on the detection results.

9. The power supply system switching device according to claim 3, wherein the current/voltage detection section includes voltage detectors for detecting the voltage polarities of the respective first and second bypass switches, and the first turning-on section turns on one of the switch elements of the semiconductor switch, based on the detection results.

10. The power supply system switching device according to claim 2, wherein the second turning-on section includes a voltage detector for detecting voltage across the semiconductor switch, and, based on the voltage, determines whether current flowing through the first bypass switch is zero.

11. The power supply system switching device according to claim 3, wherein the second turning-on section includes a voltage detector for detecting voltage across the semiconductor switch, and, based on the voltage, determines whether current flowing through the first bypass switch is zero.

12. The power supply system switching device according to claim 1, wherein the semiconductor switch comprises a pair of thyristor switches connected in inverse-parallel to each other.

13. The power supply system switching device according to claim 2, wherein the semiconductor switch comprises a pair of thyristor switches connected in inverse-parallel to each other.

14. The power supply system switching device according to claim 3, wherein the semiconductor switch comprises a pair of thyristor switches connected in inverse-parallel to each other.

15. A method of switching between power supply systems in which power to a load is switched from a first power supply system to a second power supply system, the load being connected to the connection point of first and second mechanical bypass switches connected in series with the first and second power supply systems, respectively, and a semiconductor switch connected in parallel with the second bypass switch, the method comprising:

opening the first bypass switch and causing the semiconductor switch to conduct whereby current formerly flowing through the first bypass switch is commutated to flow initially through the semiconductor switch, closing the second bypass switch, whereby the load is switched and connected to the second power supply system, and, thereafter, switching the semiconductor switch from being connected in parallel with the second bypass switch to being connected in parallel with the first bypass switch.

16. The method of switching between power supply systems according to claim 15, wherein the semiconductor switch comprises a pair of semiconductor switch elements connected in inverse-parallel to each other, the method comprising opening the first bypass switch, turning on one of the switch elements of the semiconductor switch based on one of current direction and voltage-polarity of current flowing through the first bypass switch, turning on both of the switch elements of the semiconductor switch after the current flowing through the first bypass switch becomes zero, closing the second bypass switch after both of the switch elements of the semiconductor switch are turned on, and turning off both of the switch elements of the semiconductor switch after the second bypass switch is closed.

17. A method of switching between the first and second power supply systems according to claim 15, wherein the semiconductor switch comprises a pair of semiconductor switch elements connected in inverse-parallel to each other, the method comprising opening a first of the first and second bypass switches, turning on one of the switch elements of the semiconductor switch, based on one of current directions and voltage polarities of currents flowing through the first and second bypass switches, turning on both of the switch elements of the semiconductor switch after the current flowing through the first of the first and second bypass switches becomes zero, closing the second of the first and second bypass switches after both of the switch elements of the semiconductor switch are turned on, and turning off both of the switch elements of the semiconductor switch after the other of the first and second bypass switches is closed.

* * * * *